United States Patent
Pritchard et al.

(10) Patent No.: US 11,150,902 B2
(45) Date of Patent: Oct. 19, 2021

(54) PROCESSOR PIPELINE MANAGEMENT DURING CACHE MISSES USING NEXT-BEST TICKET IDENTIFIER FOR SLEEP AND WAKEUP

(71) Applicant: International Business Machines Corporation, Armonk, NY (US)

(72) Inventors: Taylor J. Pritchard, Poughkeepsie, NY (US); Jonathan Hsieh, Poughkeepsie, NY (US); Michael Cadigan, Jr., Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 16/272,262

(22) Filed: Feb. 11, 2019

(65) Prior Publication Data
US 2020/0257632 A1  Aug. 13, 2020

(51) Int. Cl.
*G06F 9/30* (2018.01)
*G06F 9/38* (2018.01)

(52) U.S. Cl.
CPC ........ *G06F 9/30043* (2013.01); *G06F 9/3824* (2013.01)

(58) Field of Classification Search
CPC .......................... G06F 9/30043; G06F 9/3824
See application file for complete search history.

(56) References Cited

U.S. PATENT DOCUMENTS

| | | | |
|---|---|---|---|
| 5,724,536 A * | 3/1998 | Abramson | G06F 9/30043 712/216 |
| 9,146,871 B2 | 9/2015 | Steely, Jr. et al. | |
| 10,152,421 B2 | 12/2018 | Sasanka | |
| 2016/0026574 A1 | 1/2016 | Frank et al. | |
| 2017/0139710 A1 | 5/2017 | Zbiciak | |
| 2017/0242797 A1 | 8/2017 | Wang et al. | |

FOREIGN PATENT DOCUMENTS

EP   0463978   1/1992

OTHER PUBLICATIONS

Jamil, RAM versus CAM, 1997, IEEE, 0278-6648/97, 4 pages (Year: 1997).*

* cited by examiner

*Primary Examiner* — Jyoti Mehta
(74) *Attorney, Agent, or Firm* — Cantor Colburn LLP; Margaret McNamara (57) ABSTRACT

Systems and methods of performing processor pipeline management include receiving an instruction for processing, determining that data in a first memory sub-group of a memory group needed to process the instruction is not available in a cache that ensures fixed latency access, and determining that the instruction should be put in a sleep state. The sleep state indicates that the instruction will not be reissued until the instruction is moved to a wakeup state. The methods also include associating the instruction with a ticket identifier (ID) that corresponds with a second memory sub-group of the memory group, and moving the instruction to the wakeup state based on the second memory sub-group of the memory group being moved into the cache.

11 Claims, 5 Drawing Sheets received instruction: memory group 0 memory sub-group 6

410

| ticket ID (140) | memory group (150) | memory sub-group (155) |
|---|---|---|
| 0 | 0 | 4 |
| 1 | 0 | 1 |
| 2 | 1 | 0 |
| 3 | 2 | 2 |
| CAID | -- | -- |

FIG. 1

FIG. 2 received instruction: memory group 0 memory sub-group 6

| ticket ID (140) | memory group (150) | memory sub-group (155) | order in memory group |
|---|---|---|---|
| 0 | 0 | 4 | 1 |
| 1 | 0 | 1 | 0 |
| 2 | 1 | 0 | 1 |
| 3 | 2 | 2 | 1 |
| CAID | ... | ... | |

310

FIG. 3 received instruction: memory group 0 memory sub-group 6

| ticket ID (140) | memory group (150) | memory sub-group (155) |
|---|---|---|
| 0 | 0 | 4 |
| 1 | 0 | 1 |
| 2 | 1 | 0 |
| 3 | 2 | 2 |
| CAID | -- | -- |

PROCESSOR PIPELINE MANAGEMENT DURING CACHE MISSES USING NEXT-BEST TICKET IDENTIFIER FOR SLEEP AND WAKEUP

BACKGROUND

The present invention relates to software processing, and more specifically, to processor pipeline management during cache misses.

A software program involves the execution of many instructions by the processor. Instruction pipelining is a technique to implement instruction-level parallelism within a single processor. Instructions are divided into a series of sequential steps (i.e., pipelines) that are performed by different processor units in parallel. Thus, every part of the processor can be used at all times to increase the throughput. Through the pipelining technique, multiple instructions can be overlapped during execution. For example, an instruction sequencing unit (ISU) provides an instruction to a load-store unit (LSU). The ISU allows for out-of-order instruction processing to be performed. This can be combined with the parallelism afforded by pipelined execution. The LSU determines if data needed by the instruction is readily available in cache memory (i.e., if the data is in on-core cache). When the data is not readily available, the scenario is referred to as a cache miss.

SUMMARY

Embodiments of the present invention are directed to systems and methods to perform processor pipeline management. The method includes receiving an instruction for processing, determining that data in a first memory sub-group of a memory group needed to process the instruction is not available in a cache that ensures fixed latency access, and determining that the instruction should be put in a sleep state. The sleep state indicates that the instruction will not be reissued until the instruction is moved to a wakeup state. The method also includes associating the instruction with a ticket identifier (ID) that corresponds with a second memory sub-group of the memory group, and moving the instruction to the wakeup state based on the second memory sub-group of the memory group being moved into the cache.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

As previously noted, pipeline processing facilitates out-of-order execution of instructions for decreased latency and improved performance. As also noted, the data needed by a given instruction may not be readily available in cache memory (i.e., a cache miss scenario in which the data is not in on-core cache). The ISU maintains a queue of instructions to send to the LSU. When an instruction from the queue is provided to the LSU but the LSU does not have data needed by the instruction, the LSU sends the instruction back to the ISU (i.e., rejects the instruction). The rejected instruction can be put back in the queue of the ISU or put to sleep with a corresponding ticket. That is, the LSU can use a ticketing mechanism to ensure that an instruction is not sent back from the ISU (i.e., the instruction is not in the ISU's regular queue) until the data needed by the instruction is available.

According to the conventional ticketing system, when the LSU rejection of an instruction is accompanied by a ticket identifier (ID), the ISU puts the instruction to sleep (i.e., does not return the instruction to its queue) until the LSU indicates that the data needed by the instruction is available and the ISU can wake up the instruction for re-issue to the LSU. The LSU maintains a registry of ticket IDs with the corresponding data needed. If another subsequently rejected instruction needs the same data as a previous instruction that has been put to sleep, the ticket ID of the previous instruction is reused for the subsequently rejected instruction. Then, both instructions are woken up upon the data becoming available in cache memory. However, there are a finite number of ticket IDs available in the registry. Thus, despite the reuse of ticket IDs corresponding to the same data, there may not be tickets available for additionally rejected instructions awaiting data that need to be put to sleep. If these instructions are not put to sleep, they will continue to be re-issued as part of the ISU queue before the necessary data is available, thereby tying up resources and increasing inefficiency.

In prior pipeline systems, when all available ticket IDs have already been issued, a reserved ticket ID referred to, for example, as the catch-all ID (CA ID) is issued. This CA ID can be issued to multiple instructions, as needed. Unlike other ticket IDs, the CA ID is not associated with a particular set of data. Thus, all instructions that are associated with the CA ID are woken up every time any new data is brought into on-core cache. Because instructions that have been put to sleep are woken up and reissued by the ISU to the LSU even when the on-core cache still lacks the data needed by the instructions, this approach of dealing with the limit on ticket IDs can be inefficient.

One or more embodiments of the invention relate to processor pipeline management during cache misses. The CA ID is still used as a last resort. However, according to exemplary embodiments of the invention, an already in-use ticket ID is issued, when possible, as a next-best option. That is, the latest instruction to be put to sleep may not need the same data as an already-asleep instruction with a ticket ID. However, according to one or more embodiments of the invention, it can be deemed more efficient to wake up the latest instruction only after the data needed by the already-asleep instruction is in on-core cache, as detailed. When the next-best option is available, the CA ID can be avoided. Thus, embodiments of the invention result in lower latency and higher performance in pipeline-based out-of-order processing and, consequently, an improvement to the computer system.

Figure 1:
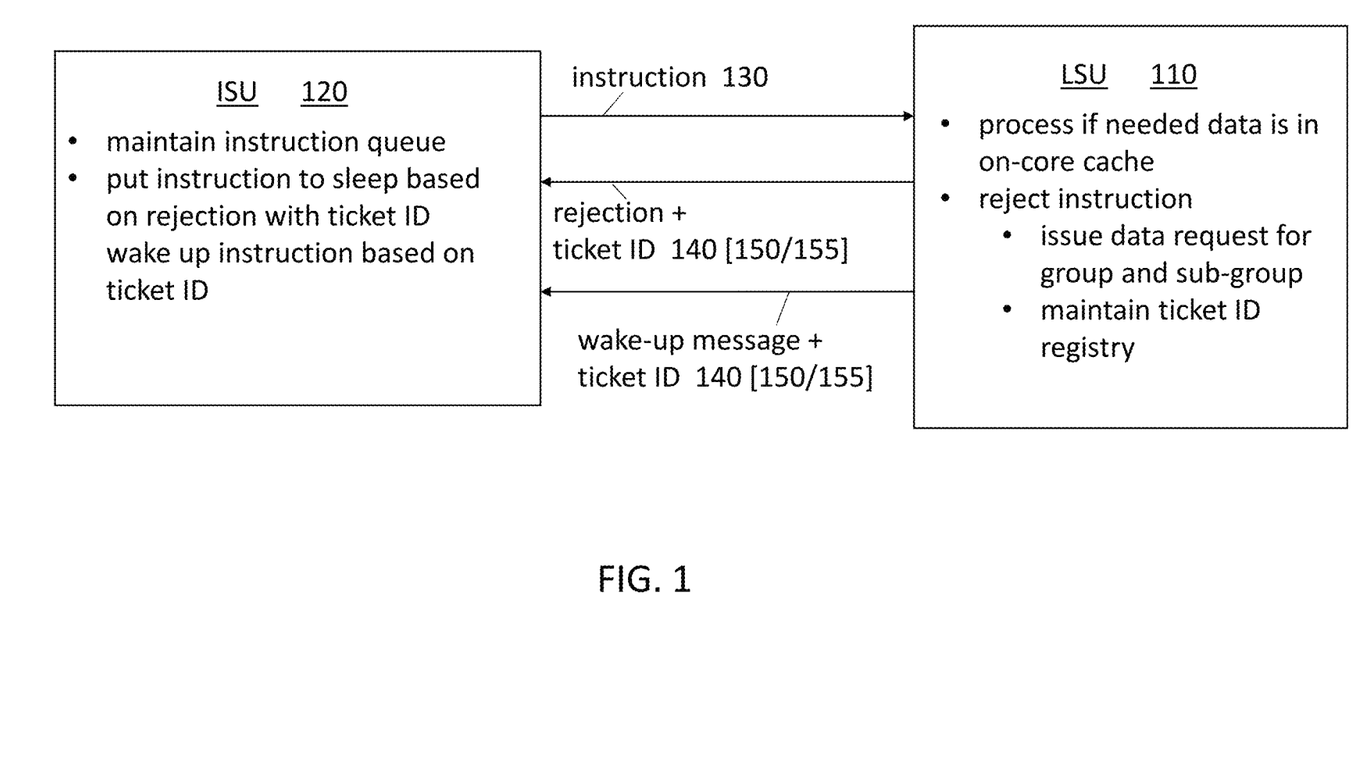
FIG. 1 indicates relevant aspects of instruction pipeline processing according to an exemplary embodiment of the invention.

FIG. 1 indicates relevant aspects of instruction pipeline processing according to an exemplary embodiment of the invention. In alternate embodiments of the invention, the ISU 120 and LSU 110 can be referred to differently and their roles can be assigned differently between each other or to additional processing units. In the exemplary case, the ISU 120 sends an instruction 130 for processing to the LSU 110. Upon receiving the instruction, the LSU 110 determines if data needed by the instruction 130 is available in on-core cache (e.g., L1 and L2 cache). The process of retrieving data from on-core cache represents a fixed-latency response. Thus, the LSU 110 can proceed to process the instruction if the necessary data is in on-core cache.

However, if the necessary data is not in on-core cache, the process the LSU 110 must undertake to retrieve the data does not have a fixed latency. The data may be stored in real memory, for example. When the data needed by the instruction 130 is not in on-core cache, the LSU 110 can issue a rejection with a ticket ID 140 to the ISU 120. In response, the ISU 120 puts that instruction 130 to sleep. That is, the ISU 120 removes that instruction 130 from the queue so that it is not re-issued to the LSU 110 unnecessarily. The LSU 110 also issues a data request for the needed data. In an exemplary embodiment of the invention, the data request is issued to L3 cache, which can access cache lines that are not available in on-core memory.

Also according to an exemplary embodiment of the invention, the data needed by an instruction 130 is a sub-group 155 of a group 150 of data. For example, the data can be organized such that the sub-groups 155 are quadwords within a group 150 that is a cache line. Thus, the instruction 130 can require a particular quadword 155 within a particular cache line 150. The granularity of data associated with a ticket ID 140 is a quadword 155 of a cache line 150. The LSU 110 maintains the ticket ID registry 310 (FIG. 3), 410 (FIG. 4) according to one or more embodiments of the invention.

When the data request by the LSU 110 is complete, a wake-up message with the ticket ID 140 associated with the data is sent to the ISU 120. The ISU 120 then wakes up the instruction 130 that corresponds with the ticket ID 140 and re-issues it to the LSU 110 for processing. According to one or more embodiments of the invention, the ticket ID issued to an instruction 130 that does not have the needed data available in on-core memory is determined more efficiently than in prior systems by using a next-best ticket ID 140 when possible rather than reverting to the CA ID when additional ticket IDs 140 are unavailable and the data needed by the instruction 130 (the group 150 and sub-group 155) is not already associated with a ticket ID 140 that can be reissued. The issuing of ticket IDs 140 is detailed for exemplary embodiments of the invention with reference to FIGS. 2-4.

Figure 2:
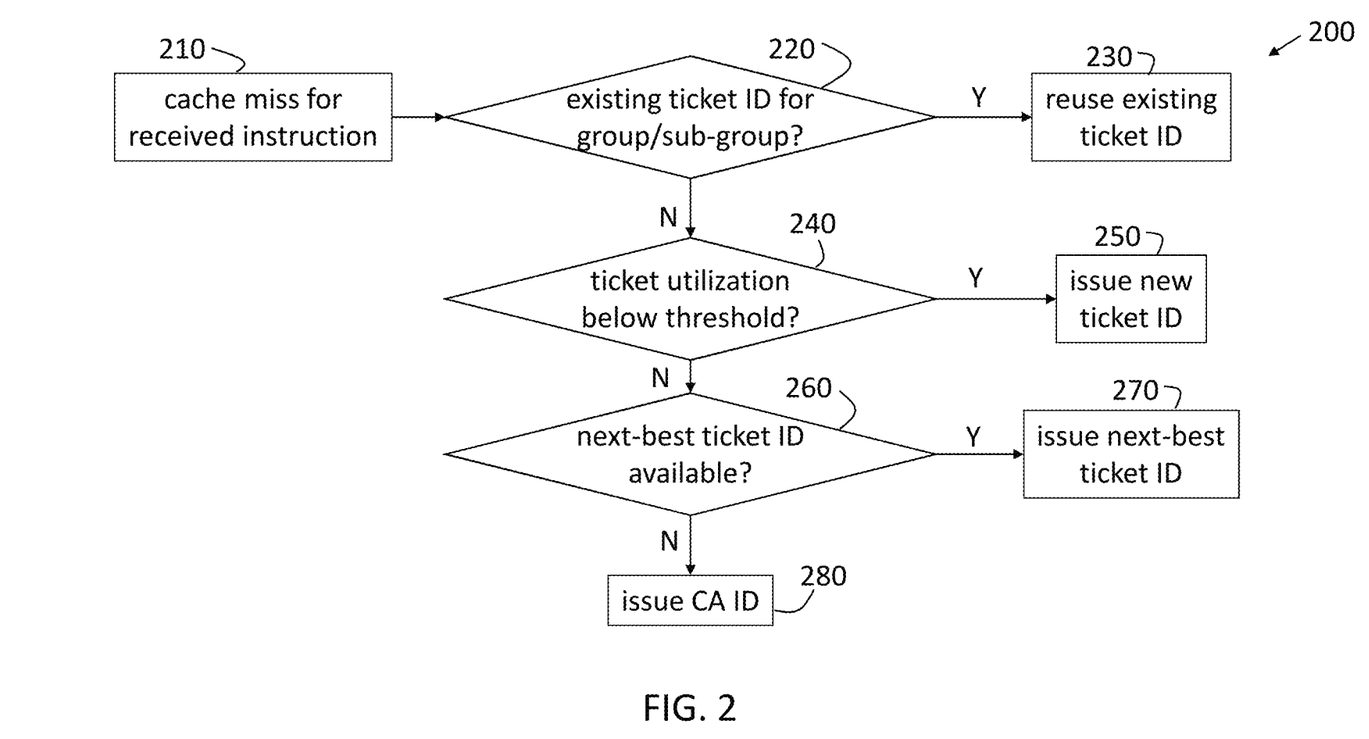
FIG. 2 is a process flow of a method of performing processor pipeline management during cache misses according to one or more embodiments of the invention.

FIG. 2 is a process flow 200 of a method of performing processor pipeline management during cache misses according to one or more embodiments of the invention. According to the exemplary pipeline structure discussed with reference to FIG. 1, the LSU 110 performs the processes shown in FIG. 2. The process flow 200 begins when there is a cache miss for a received instruction 130, at block 210. As previously noted, a cache miss indicates that the LSU 120 was not able to find the data needed by the received instruction 130 in on-core cache (e.g., L1 or L2 cache). Then, the first check that is done, at block 220, is whether an existing ticket ID corresponds with the same group 150 and sub-group 155 of data needed by the received instruction 130. If so, then, at block 230, the existing ticket ID 140 is reused for the received instruction 130. If the received instruction 130 does not need data that is already associated with an existing ticket ID 140, according to the check at block 220, then the ticket utilization is checked at block 240. That is, if the number of ticket IDs 140 already issued is below the limit of the number available, then a new ticket ID 140 is issued for the received instruction 130 and provided to the ISU 120 along with the rejection, at block 250.

On the other hand, if the check at block 240 indicates that the ticket utilization has reached the threshold and no new ticket IDs 140 are available, then a check is done, at block 260, of whether a next-best ticket ID 140 is available within the already-issued ticket IDs. Two different exemplary embodiments for performing this determination at block 260 are detailed with reference to FIGS. 3 and 4. When it is determined, at block 260, that a next-best ticket ID is available for the received instruction 130 among already-issued ticket IDs 140, the next-best ticket ID 140 is issued at block 270. If a next-best ticket ID 140 is not available based on the check at block 260, then the CA ID is issued, at block 280. Thus, as noted previously, the CA ID is used as a last resort but, according to one or more embodiments of the invention, is not the only resort when the threshold number of available ticket IDs 140 has been reached.

Figure 3:
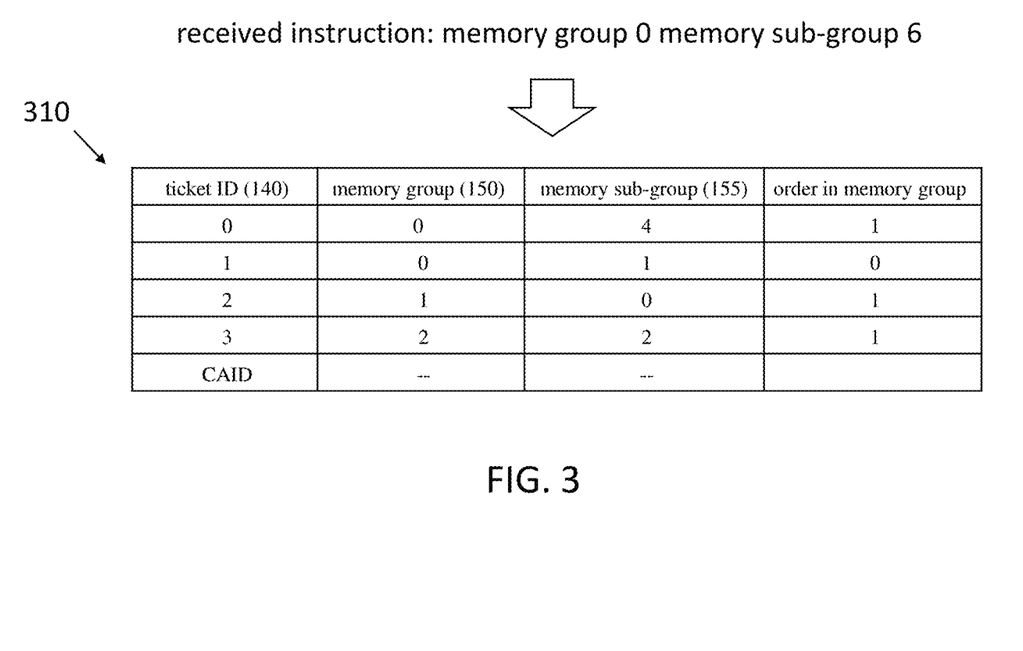
FIG. 3 shows an exemplary ticket identifier registry according to an exemplary embodiment of the invention.

FIG. 3 shows an exemplary ticket ID registry 310 according to an exemplary embodiment of the invention. The exemplary ticket ID registry 310 includes four fields: the ticket ID 140, the corresponding memory group 150 and memory sub-group 155, and a bit indicating an order of the ticket ID 140 with respect to the memory group 150. The order bit is "1" for the first ticket ID 140 that is issued for a given memory group 150 and "0" for any subsequent ticket ID 140 in the ticket ID registry 310 that is issued for the same memory group 150. In the exemplary ticket ID registry 310 shown in FIG. 3, the ticket ID 140 of 0 issued to an instruction 130 needing data from a memory group 150 of 0 has an order bit of "1" and the ticket ID 140 of 1, which is issued to another instruction 130 also needing data from the memory group 150 of 0, has an order bit of "0." This means that the ticket ID 140 of 0 (corresponding with order bit "1") was issued first and the ticket ID 140 of 1 (corresponding with order bit "0") was issued subsequently. In alternate embodiments, an indication other than the order bit can be used, and the meaning of an order bit of "1" and "0" can be different.

In the example shown in FIG. 3, it can be assumed that the threshold number of ticket IDs 140 has been reached. Thus, when a newly received instruction 130, which requires data from a memory group 150 of 0 and a memory sub-group 155 of 6, experiences a cache miss, the process flow 200 shown in FIG. 2 is implemented. As the ticket ID registry 310 indicates, no existing ticket ID 140 corresponds with a memory group 150 of 0 and a memory sub-group 155 of 6. Thus, the result of the check at block 220 is "N." Because the threshold number of ticket IDs 140 is already in use, the result of the check at block 240 is also "N."

According to an exemplary embodiment of the invention, the next-best ticket ID 140 corresponds with the same memory group 150 needed by the received instruction 130 and with the order bit indicating "1" (i.e., the earliest issued ticket ID 140 for the same memory group 150). The feasibility of the next-best ticket ID 140, according to any of the embodiments of the invention, is based on the fact that the LSU 110 does not request a memory sub-group 155 but, rather, the entire memory group 150. That is, the memory group 150 can be thought of as the width of the request (e.g., a cache line) while the memory sub-group 155 can be thought of as the width of a response (e.g., quadword). Thus, the requested memory group 150 is received one memory sub-group 155 at a time. Because all of the memory sub-groups 155 of a memory group 150 will be received even though only one particular memory subgroup 155 is needed by the relevant instruction 130, the other received memory sub-groups 155 may be needed by another instruction 130. This gives rise to the next-best ticket ID 140 being a ticket ID that corresponds with the same memory group 150 but with a different memory sub-group 155.

According to the exemplary embodiment relevant to FIG. 3, when multiple ticket IDs 140 correspond with the same memory group 150 needed by the received instruction 130, the next-best ticket ID 140 is the one with order bit "1" according to the exemplary embodiment. In the exemplary ticket ID registry 310, both the ticket ID 140 of 0 and the ticket ID 140 of 1 correspond with the memory group 150 of 0. However, ticket ID 140 of 0 has an order bit of "1," indicating that it is the earlier-issued ticket ID 140 corresponding with the memory group 150 of 0. Thus, the received instruction is rejected with a corresponding next-best ticket ID 140 of 0.

Figure 4:
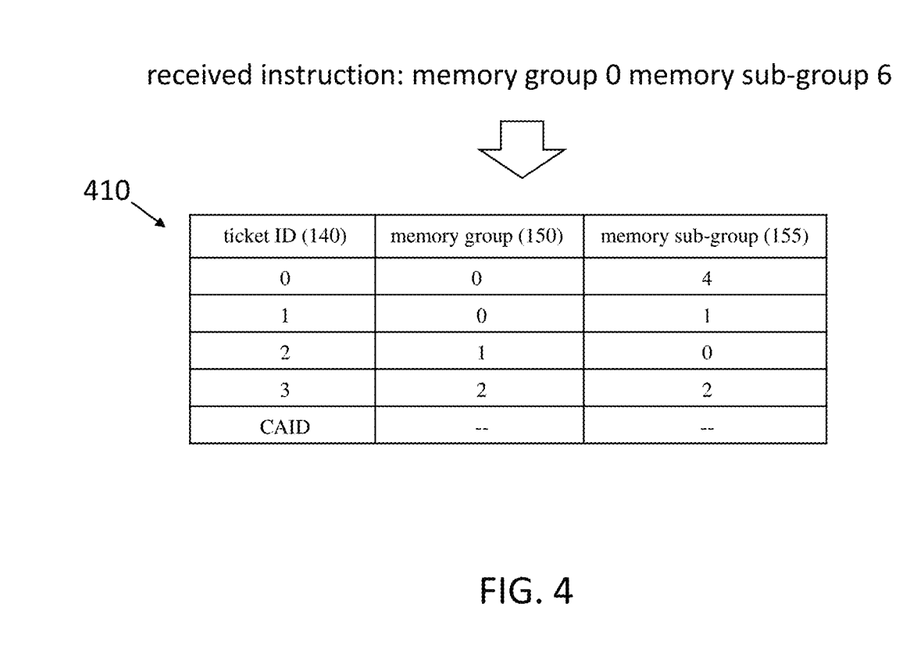
FIG. 4 shows an exemplary ticket identifier registry according to another exemplary embodiment of the invention.

FIG. 4 shows an exemplary ticket ID registry 410 according to another exemplary embodiment of the invention. FIG. 4 also shows the data needed by a newly received instruction 130. As FIG. 4 indicates, the data associated with the ticket IDs 140 in the ticket ID registry 410 is the same as the data associated with the ticket IDs 140 in the ticket ID registry 310 (FIG. 3) but the order bit field is not part of the ticket ID registry 410. In addition, the data needed by the received instruction 130 is the same, and the threshold number of ticket IDs 140 can again be assumed to have been reached. While the order bit field is not part of the ticket ID registry 410, the order in which memory sub-groups 155 of the memory group 150 are received is known. For example, ten memory sub-groups 155 may be part of each memory group 150. If the memory sub-group 155 of 4 (within the memory group 150 of 0) is requested first, it will be received first.

Once the data for the memory group 150 of 0 and the memory sub-group 155 of 4 is in on-core cache, the instruction 130 corresponding with the ticket ID 140 of 0 will be woken up. Additionally, the request for the memory group 150 of 0 and the memory sub-group 155 of 4 will result in all the other nine memory sub-groups 155 of the memory group 150 of 0 also being moved to on-core cache. When the data for the memory group 150 of 0 and the memory sub-group 155 of 1 is in on-core cache (as part of the fulfillment of the request), the instruction 130 corresponding with the ticket ID 140 of 1 will be woken up. The receipt order (i.e., the order in which the memory sub-groups 155 are put in on-core cache) can be, for example, 4, 2, 5, 1, 8, 6, 0, 3, 7, 9.

According to the exemplary embodiment relevant to FIG. 4, when multiple ticket IDs 140 correspond with the same memory group 150 needed by the received instruction 130, the next-best ticket ID 140 is the one corresponding with a memory sub-group 155 that is closest to but earlier than the sub-group 155 needed by the received instruction 130 in the receipt order. In the exemplary case shown in FIG. 4, the order of receipt of memory sub-group 155 of 1 (which corresponds with the ticket ID of 1) is closest to but earlier than the order of receipt of the memory sub-group 155 of 6. Thus, the next-best ticket ID 140 for the received instruction 130 is the ticket ID 140 of 1. According to this exemplary embodiment, the received instruction 130 will not be woken up when the data associated with the memory sub-group 155 of 4 arrives in on-core cache. Instead, the received instruction 130 will be woken up after the data associated with the memory sub-group 155 of 1 arrives in on-core cache. As a result of foreknowledge of the receipt order, one or more cycles of issuing that instruction 130 in the interim between receipt of the sub-group 155 of 4 and the receipt of the sub-group 155 of 1 can be avoided.

Figure 5:
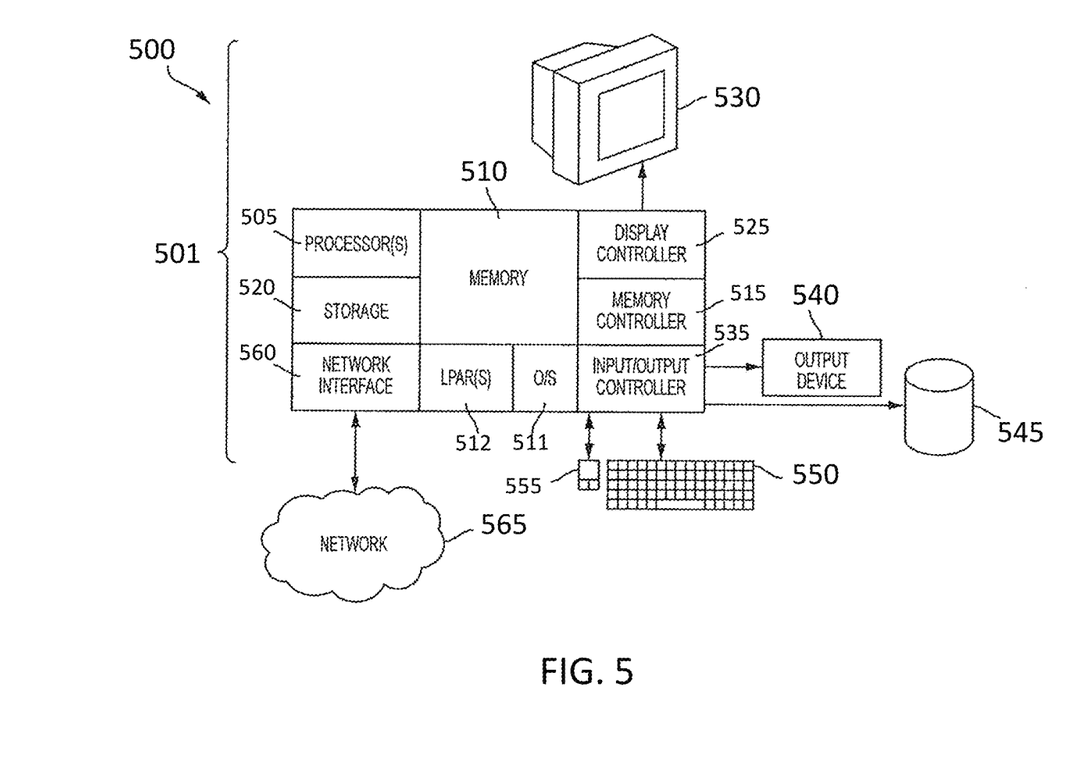
FIG. 5 is a block diagram of a computer system for processor operation and pipeline management in accordance with one or more embodiments of the invention.

Turning now to FIG. 5, a computer system for processor operation and pipeline management is generally shown in accordance with one or more embodiments of the invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 500, therefore, may include a general-purpose computer or mainframe 501 capable of running multiple instances of an O/S simultaneously.

In an exemplary embodiment, in terms of hardware architecture, as shown in FIG. 5, the computer 501 includes one or more processors 505, memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 535 may include a plurality of sub-channels configured to access the output devices 540 and 545. The sub-channels may include fiber-optic communications ports.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the processor 505.

The instructions in memory 510 may include one or more separate programs, each of which comprises an ordered listing of executable instructions for implementing logical functions. In the example of FIG. 5, the instructions in the memory 510 a suitable operating system (OS) 511. The operating system 511 essentially controls the execution of other computer programs and provides scheduling, input-output control, file and data management, memory management, and communication control and related services.

The memory 510 may include multiple logical partitions (LPARs) 512, each running an instance of an operating system. The LPARs 512 may be managed by a hypervisor, which may be a program stored in memory 510 and executed by the processor 505.

In an exemplary embodiment, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to execute instructions stored within the memory 510, to communicate data to and from the memory 510, and to generally control operations of the computer 501 pursuant to the instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of performing processor pipeline management, comprising:
   maintaining a registry of all ticket IDs, wherein each entry of the registry includes one of the ticket IDs;
   receiving, using a processor, an instruction for processing;
   determining, using the processor, that data in a first memory sub-group of a memory group needed to process the instruction is not available in a cache that ensures fixed latency access;
   determining, using the processor, that the instruction should be put in a sleep state based on the data in the first memory sub-group of the memory group not being available in the cache, wherein the sleep state indicates that the instruction will not be reissued until the instruction is moved to a wakeup state;
   determining an order in which data from all memory sub-groups, including the first memory sub-group and a second memory sub-group, of the memory group will be added to the cache;
   associating, using the processor, the instruction with a next-best ticket identifier (ID), wherein the next-best ticket ID corresponds, in the registry, with the second memory sub-group of the memory group rather than with the first memory sub-group of the memory group needed by the instruction, wherein the associating the next-best ticket ID includes determining that the second memory sub-group is a closest preceding one to the first memory sub-group in the order among all memory sub-groups of the memory group that correspond with any ticket ID in the registry; and
   moving, using the processor, the instruction to the wakeup state based on data associated with the next-best ticket ID, which is the data in the second memory sub-group of the memory group rather than the data in the first memory sub-group of the memory group, being moved into the cache.

2. The computer-implemented method according to claim 1, wherein the memory group is a first memory group and the next-best ticket ID is a first ticket ID, the method further comprising maintaining the registry of all ticket IDs including the first ticket ID and one or more other ticket IDs, wherein each of the one or more other ticket IDs corresponds, in the registry, with the first memory group and a different memory sub-group than the first memory sub-group or the second memory sub-group or with a different memory group than the first memory group and a memory sub-group of the different memory group.

3. The computer-implemented method according to claim 2, wherein the associating the instruction with the first ticket ID includes selecting the first ticket ID from the registry.

4. The computer-implemented method according to claim 2, wherein the maintaining the registry of all ticket IDs includes maintaining a catch-all ticket ID whose entry in the registry does not include any particular memory group.

5. A system to perform processor pipeline management, comprising:
  a cache that provides fixed-latency storage access; and
  a processor configured to maintain a registry of all ticket IDs, wherein each entry of the registry includes one of the ticket IDs, to obtain an instruction for processing, to determine that data in a first memory sub-group of a memory group needed to process the instruction is not available in the cache, to determine that the instruction should be put in a sleep state based on the data in the first memory sub-group of the memory group not being available in the cache, wherein the sleep state indicates that the instruction will not be reissued until the instruction is moved to a wakeup state, to determine an order in which data from all memory sub-groups, including the first memory sub-group and a second memory sub-group, of the memory group will be added to the cache, to associate the instruction with a next-best ticket identifier (ID), wherein the next-best ticket ID corresponds, in the registry, with the second memory sub-group of the memory group rather than with the first memory sub-group of the memory group needed by the instruction and the processor is configured to associate the next-best ticket ID by determining that the second memory sub-group is a closest preceding one to the first memory sub-group in the order among all memory sub-groups of the memory group that correspond with any ticket ID in the registry, and to move the instruction to the wakeup state based on data associated with the next-best ticket ID, which is the data in the second memory sub-group of the memory group rather than the data in the first memory sub-group of the memory group, being moved into the cache.

6. The system according to claim 5, wherein the memory group is a first memory group and the next-best ticket ID is a first ticket ID, wherein the registry of all ticket IDs includes the first ticket ID and one or more other ticket IDs, and each of the one or more other ticket IDs corresponds, in the registry, with the first memory group and a different memory sub-group than the first memory sub-group or the second memory sub-group or with a different memory group than the first memory group and a memory sub-group of the different memory group.

7. The system according to claim 6, wherein the processor is configured to associate the instruction with the first ticket ID by selecting the first ticket ID from the registry.

8. The system according to claim 6, wherein the registry of all ticket IDs includes a catch-all ticket ID whose entry in the registry does not include any particular memory group.

9. A computer program product for performing processor pipeline management, the computer program product comprising a computer readable storage medium having program instructions embodied therewith, the program instructions executable by a processor to perform a method comprising:
  maintaining a registry of all ticket IDs, wherein each entry of the registry includes one of the ticket IDs;
  receiving an instruction for processing;
  determining that data in a first memory sub-group of a memory group needed to process the instruction is not available in a cache that ensures fixed latency access;
  determining that the instruction should be put in a sleep state based on the data in the first memory sub-group of the memory group not being available in the cache, wherein the sleep state indicates that the instruction will not be reissued until the instruction is moved to a wakeup state;
  determining an order in which data from all memory sub-groups, including the first memory sub-group and a second memory sub-group, of the memory group will be added to the cache;
  associating the instruction with a next-best ticket identifier (ID), wherein the next-best ticket ID corresponds, in the registry, with the second memory sub-group of the memory group rather than with the first memory sub-group of the memory group needed by the instruction, wherein the associating the next-best ticket ID includes determining that the second memory sub-group is a closest preceding one to the first memory sub-group in the order among all memory sub-groups of the first memory group that correspond with any ticket ID in the registry; and
  moving, using the processor, the instruction to the wakeup state based on data associated with the next-best ticket ID, which is the data in the second memory sub-group of the memory group rather than the data in the first memory sub-group of the memory group, being moved into the cache.

10. The computer program product according to claim 9, wherein the memory group is a first memory group and the next-best ticket ID is a first ticket ID, the method further comprising maintaining the registry of all ticket IDs including the first ticket ID and one or more other ticket IDs, wherein each of the one or more other ticket IDs corresponds, in the registry, with the first memory group and a different memory sub-group than the first memory sub-group or the second memory sub-group or with a different memory group than the first memory group and a memory sub-group of the different memory group.

11. The computer program product according to claim 10, wherein the associating the instruction with the first ticket ID includes selecting the first ticket ID from the registry.

* * * * *